US007040531B2

(12) United States Patent
Skinner

(10) Patent No.: US 7,040,531 B2
(45) Date of Patent: May 9, 2006

(54) DOCUMENT HANDLING MACHINE

(75) Inventor: John Alan Skinner, Hampshire (GB)

(73) Assignee: De la Rue International Limited, Basingstoke (GB)

( * ) Notice: Subject to any disclaimer, the term of this patent is extended or adjusted under 35 U.S.C. 154(b) by 128 days.

(21) Appl. No.: 10/250,761

(22) PCT Filed: Mar. 11, 2002

(86) PCT No.: PCT/GB02/01093

§ 371 (c)(1),
(2), (4) Date: Jul. 7, 2003

(87) PCT Pub. No.: WO02/075671

PCT Pub. Date: Sep. 26, 2002

(65) Prior Publication Data

US 2004/0046015 A1 Mar. 11, 2004

(30) Foreign Application Priority Data

| | | |
|---|---|---|
| Mar. 16, 2001 | (GB) | 0106602 |
| Jun. 25, 2001 | (GB) | 0115492 |
| Aug. 2, 2001 | (GB) | 0118914 |

(51) Int. Cl.
*G06K 5/00* (2006.01)

(52) U.S. Cl. ........................................ 235/375; 235/382

(58) Field of Classification Search ................ 235/375, 235/376, 379, 380, 385, 475, 476, 382; 705/1, 705/22; 209/534
See application file for complete search history.

(56) References Cited

U.S. PATENT DOCUMENTS

| | | | | |
|---|---|---|---|---|
| 3,941,977 | A | 3/1976 | Voss et al. | |
| 4,114,027 | A | 9/1978 | Slater et al. | |
| 4,219,151 | A | 8/1980 | Haruki | |
| 4,749,087 | A * | 6/1988 | Buttifant | 209/534 |
| 6,179,457 | B1 | 1/2001 | Simonotti et al. | |
| 6,311,819 | B1 * | 11/2001 | Stromme et al. | 194/207 |
| 6,363,164 | B1 * | 3/2002 | Jones et al. | 382/135 |
| 6,390,269 | B1 * | 5/2002 | Billington et al. | 194/217 |

FOREIGN PATENT DOCUMENTS

| | | | |
|---|---|---|---|
| DE | 199 32 149 | A1 | 1/2001 |
| DE | 199 59 218 | A1 | 6/2001 |
| GB | 2 244 583 | A | 12/1991 |

* cited by examiner

*Primary Examiner*—Daniel St Cyr
(74) *Attorney, Agent, or Firm*—Oliff & Berridge, PLC

(57) ABSTRACT

A document handling machine comprised a detector system (110) for detecting one or more characteristic features of documents. A control system (100) performs a number of functions related to information obtained from the detector system (110) and/or the manner in which documents are handled. The control system (100) includes a memory (6) for storing a set of codes, each code corresponding to a respective one of the functions, and is adapted to enable a function to be performed if a supplied enabling code corresponds in a valid manner with one of the stored function codes.

17 Claims, 3 Drawing Sheets

DOCUMENT HANDLING MACHINE

The invention relates to a document handling machine, for example for handling security documents such as banknotes.

Document handling machines are known which can undertake a variety of processes and tests on documents, typically as they are fed from an input station to one or more output stations. In the case of security documents, various tests such as optical, magnetic, size tests and the like are carried out to determine authenticity, denomination and other properties. Usually, such machines are sold to customers with a particular group of detectors and other processing capabilities requested by the customer and if an upgrade is necessary, this requires a site visit to incorporate new software or hardware or alternatively the purchase of a new product.

In accordance with the present invention, a document handling machine comprises a detector system for detecting one or more characteristic features of documents; and a control system for performing a number of functions related to information obtained from the detector system and/or the manner in which documents are handled, the control system including a memory for storing a set of codes, each code corresponding to a respective one of the functions, and being adapted to enable a function to be performed if a supplied enabling code corresponds in a valid manner with one of the stored function codes.

The use of enabling codes means that a variety of advantageous features can be achieved. For example, a machine having a multitude of capabilities could be sold to a customer but only certain of those capabilities could be activated by supplying the customer and/or machine with the appropriate enabling codes. If the customer wishes to use further capabilities then he will need to pay for access to these and following payment will receive the appropriate enabling code.

The enabling codes can also be used to enable the selection of software and/or hardware features at the customerizing stage when producing the machine, or may be used as a keying-in feature supplied to the customer which causes the machine to operate initially following purchase.

In the case of security document handling machines such as the De La Rue 2650 banknote counter, it would be possible to construct and sell this with a full detector suite but only allow the customer to use certain aspects of that detector suite by supplying the appropriate enabling codes.

It will be appreciated that although the specification exemplifies the use of these codes in the 2650 Banknote Counter, the invention is aimed at all of the types of security document processing machines, such as document sorters, counters, dispensers, validators and recirculators.

Examples of the types of security type document transport systems/equipment to which this invention can be applied are described in PCT/GB01/00214 and PCT/GB01/01044, each of which can be fitted with sets of detectors such IR, UV, colour/visible, magnetic etc, positioned to determine the currency, size, authentication, validity, counterfeit, denomination, denomination series, currency series, security features, print characteristics, ink properties, etc. of the document type. The use of any one, or combination, of these detectors contributes to selectable functions for which each machine can be configured. The selectable functions identified with the machine being described in this example are SD size, 3D size, 3D value, IR, LV2 (level 2) authentication, LV2 (level 2) value, UV, and CMS (Cash Management System).

The enabling code can take a variety of forms. In a very simple form it could simply comprise the function code but once the function code is known, this will not be secure. Preferably, therefore, the supplied enabling code is encrypted, the control system being adapted to validate a stored function code with the enabling code in either its encrypted or decrypted form. In some cases, the enabling code can be decrypted and then compared with the stored function code or alternatively the function code could be encrypted and then compared with the supplied encrypted enabling code.

As explained above, the enabling code could simply comprise a function code but to achieve further security, the enabling code preferably comprises a combination of a function code and a serial number unique to the machine, the machine further comprising a store for storing the serial number. In this way, the enabling code is linked to a particular machine and cannot be used to validate the same function in a different machine.

To achieve further security, the enabling code may include an additional, preferably random, number which can be obtained from the enabling code by the control system to enable the control system to extract information from the enabling code for validating with a stored function code. This makes it very difficult to unravel the enabling code.

Although as mentioned above, the enabling code will typically include a function code, in some cases, the correspondence between the enabling code and a stored function code may be determined by performing an algorithm using the supplied enabling code and the stored function code to determine whether the outcome of the algorithm satisfies a predetermined condition. For example, the system may be designed such that a common valid outcome is achieved when the correct enabling code is combined with the stored function code, or alternatively for each stored function code there may be a unique valid outcome either stored by the machine or supplied with the enabling code which can then be checked following performance of the algorithm.

Conveniently, the control system is adapted to set a flag if a supplied enabling code is found to correspond in a valid manner with a stored function code. This makes it easy for the control system to check whether a particular function has been enabled or validated. This check could be performed only on start-up of the machine but is preferably performed at least at the commencement of each processing operation, for example a batch of banknotes or other documents, and most preferably is carried out prior to the processing of each document.

The functions may be chosen from the use of information from a designated detector of a detector system such as the performance of a UV response test and/or the processing of a response to UV illumination, or a mode of operation of the machine such as allowing the machine to stop under certain conditions.

The document handling machine is preferably adapted to handle security documents such as banknotes and may comprise a sorter, dispenser, acceptor, counter or recirculator.

An example of a banknote handling machine according to the present invention will now be described with reference to the accompanying drawings, in which.

Figure 1:
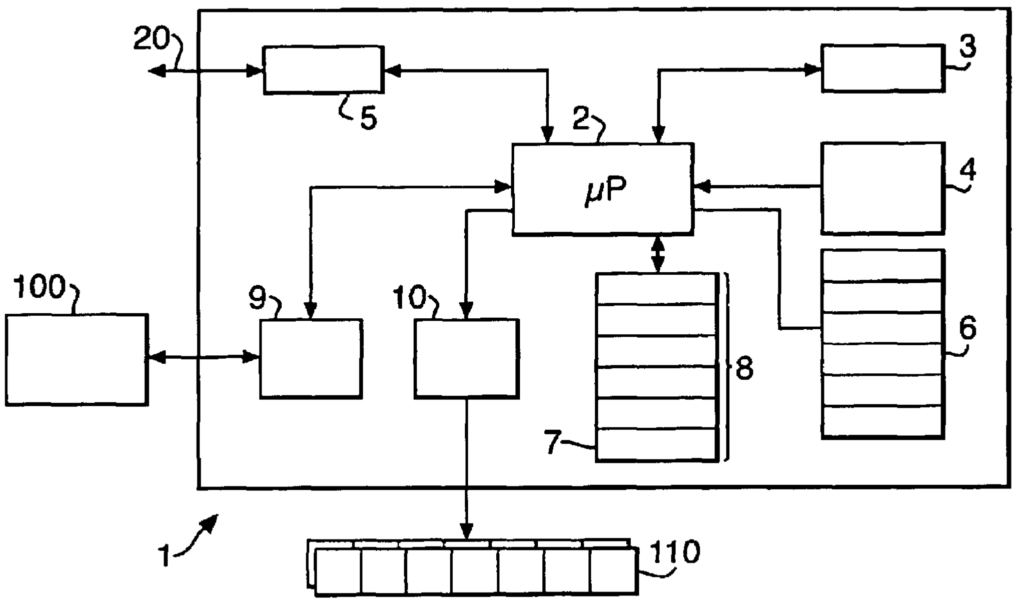
FIG. 1 is a schematic, block diagram of the components of the machine relevant to the present invention.

FIG. 1 illustrates a PCB 1 which will be mounted in the housing of a De La Rue 2650 banknote counting machine. The PCB 1 is coupled with the main machine controller 100 and also to a detector suite 110, both of conventional form. Thus, the detector suite 110 may include optical, UV, IR, and magnetic detectors.

As shown in block diagram form in FIG. 1, the PCB 1 is provided with a controlling processor 2; volatile memory 3; a chip 4 permanently containing a security or identity code which is unique to the machine; communication means 5 for transmitting data to, and receiving data from an external source 20 (FIG. 2); memory 6 permanently containing a list of functional security codes, one for each function, which in this case is common to all detector controller PCBs; memory 7 semi-permanently containing changeable 'authorised' enabling codes 8; communications port 9 which connects with the machine's main controller board 100 and function communication port 10 for communicating with each of the detector types 110 which contribute to the functions of the set 8 the user may be authorised to access.

Figure 2:
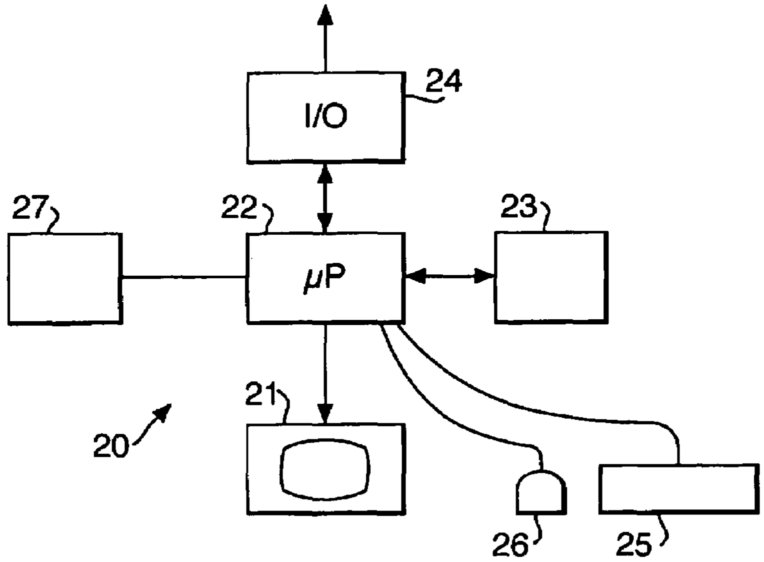
FIG. 2 illustrates schematically a Personal Computer for supplying enabling codes.

Item 20, FIG. 2, comprises, in this example, of a personal computer having a screen 21; processor 22; memory 23 which contains at least the set of function security codes also held in memory 6 on the detector controller PCB 1; communication means 24 for transmitting data to, and receiving data from the detector controller PCB 1; authorised operator inputting means in the form of a keyboard 25 and a mouse 26 and a memory 27 for holding a program including a key generator for determining the enabling code(s). Although the use of a personal computer is identified in this example it is appreciated that any other form of comparable programmable means can be used in the place of the computer. Likewise, in mentioning communication means between the Detector PCB 1 and the Personal Computer (PC) 20 and vice versa, this can take the form of any known means, for example, wired means, wireless, telephony, floppy disc, CD Rom, memory card, magnetic strip card, bar code means etc. and includes providing the information in written or verbal form and the machine operator inputting the information using the machine keyboard, keypad or a touch screen.

Figure 3:
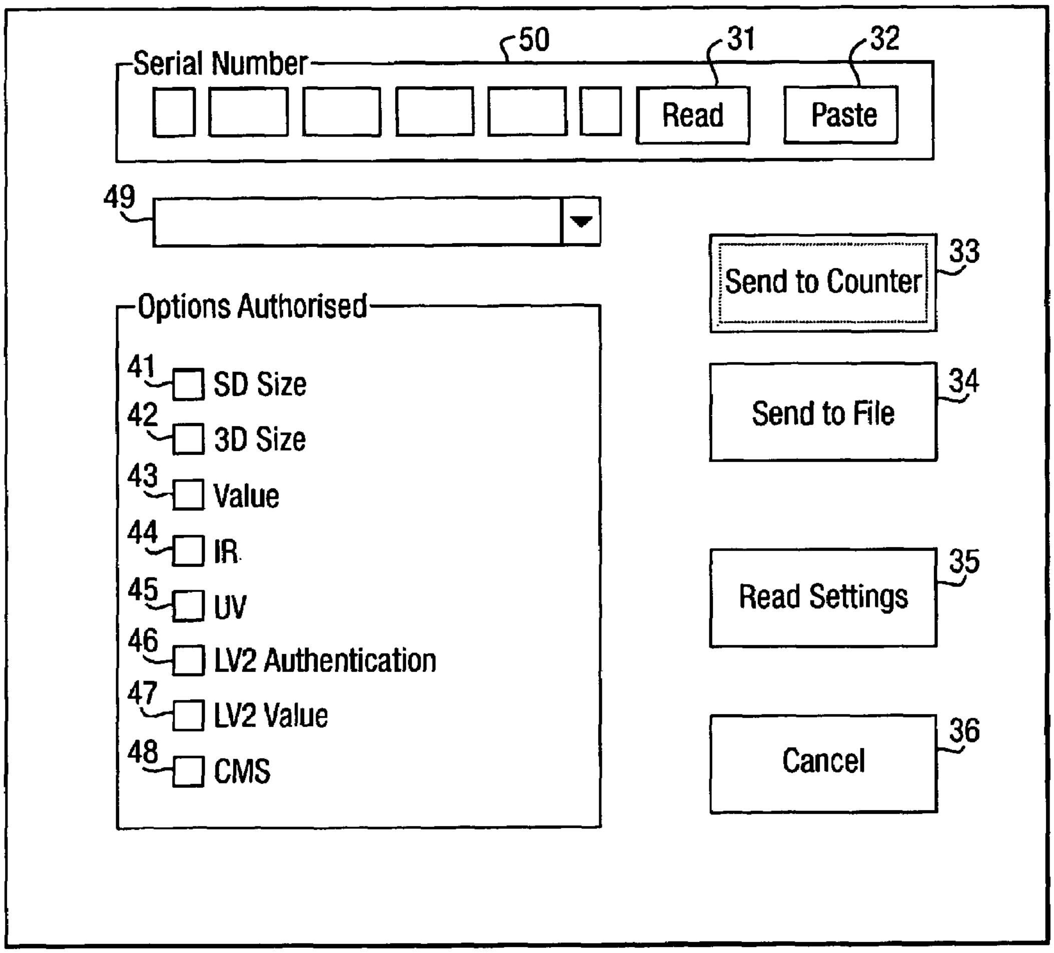
FIG. 3 is a screen display of the PC of FIG. 2.

FIG. 3 shows an example of a display on the screen 21 of the PC 20 that is active when the program 27 is being run. This shows mouse point activated buttons 31, 32, 33, 34, 35, and 36, mouse point activated selection points 41 to 48 and indicator 50 to show the inputted machine identifier code from 5. The program also provides in a drop down box 49 on screen 31, the option of selecting from a list of pre-identified machine models, the facility to identify a particular model which then automatically ticks the set of function points within the range 41 to 48, associated with the identified model.

Figure 4:
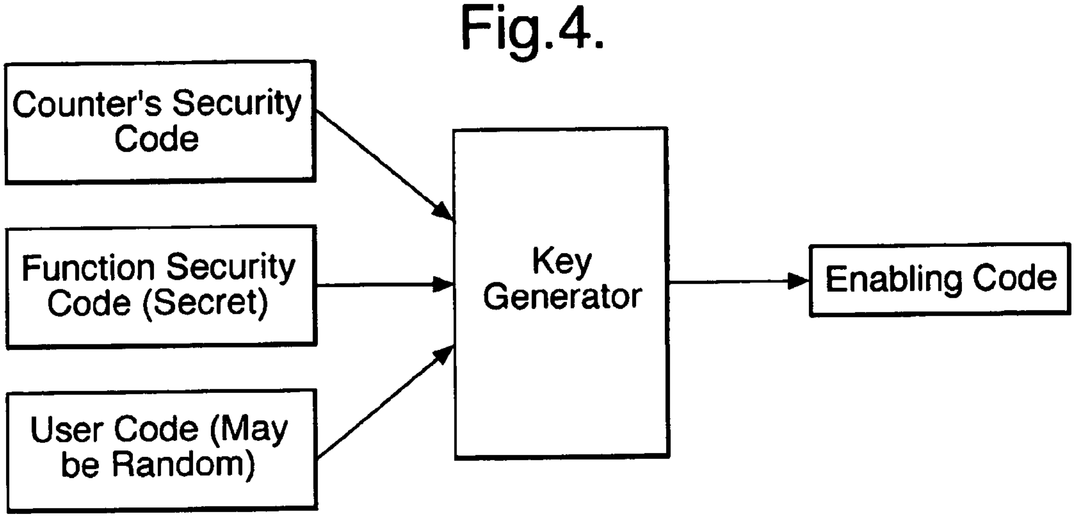
FIG. 4 is a flow diagram illustrating the generation of an enabling code.

In the operation of generating and transferring the authorised enabling codes to a single machine, details of the unique identity code contained in 4 are inputted to the processor 22, either directly as data via the communication ports 5, 24, or using the keyboard 25 and each of the functions 41 to 48 which is to be authorised for the machine in question, is selected using the mouse 26 to activate the particular function on the screen 31 of the PC 20. Upon activating the read settings button 35 the enabling code for each of the selected functions is generated by the key generator using the unique identity code, the functional security code applicable to the selected function and a factory generated user code that may be determined randomly (FIG. 4). A function index is appended at the start of the enabling code to identify the function concerned. At the same time data relating to the unique identity code from 4 and the functions selected for enablement are stored in a database (not shown) either within or remote from, the PC for future reference.

Figure 5:
FIG. 5 is a flow diagram illustrating the manner in which the enabling code is supplied to the machine; and, FIG. 6 is a flow diagram illustrating the use of the enabling code.

The enabling code set is then transferred to the memory 7 on the PCB 1 via any of the selected communication means mentioned earlier to either enter into, in the case of a new machine, or replace the authorised enabling codes stored in the memory 7 (FIG. 5).

Figure 6:
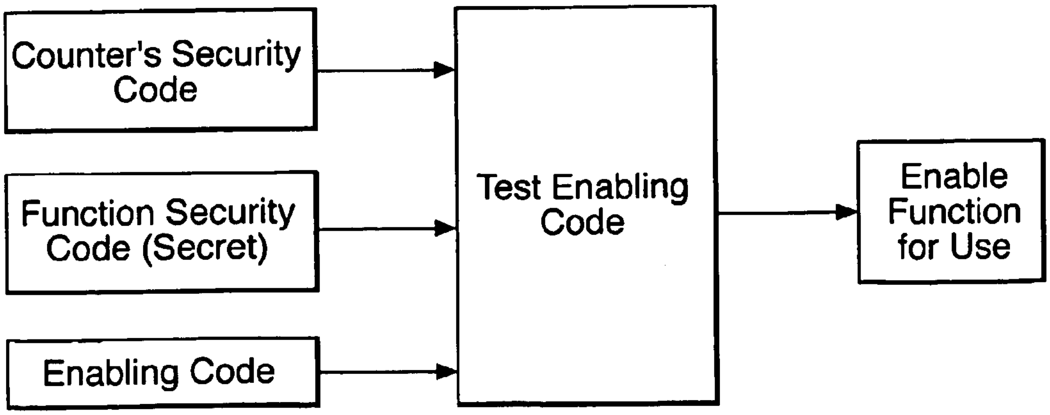

From then on, when the machine is switched on for use, the main machine controlling program instructs the detector controller processor 2 to activate only those functions the machine is authorised to use. To activate each of the functions the processor 2 collects the data concerning the machine's security code from chip 4, the relevant functional security code from memory 6 and the enabling code from memory 7 which is decoded using data contained within the enabling code (including the factory generated user code which can be extracted from the enabling code) and tested for authenticity using the counter security data and the functional security data (FIG. 6). The function is only available if the enabling code is authenticated or proved to be valid. In activating the authorised functions the detector control PCB 1 will only allow those detectors associated with the function to be switched on. Machines fitted with this facility have the means for the machine operator to manually switch on those detectors which fall within the set required for the authorised functions to allow some detector responses to be excluded from the function.

In the event a machine is required to be upgraded, for example to introduce a function for which the machine was not previously enabled, the unique machine identification data concerning the machine to be upgraded has to be provided to the facility 20. One of a number of methods of providing this data may be adopted. For example, the person possessing the machine may be provided with a certificate that provides the data. The machine label may identify the number. The display unit on the machine may display the number upon request or temporarily when switching on the machine. Additionally the identifier may be sent via the communication means 5 either directly to the facility 20 or to some intermediate data receiving facility where it is temporarily stored until the facility 20 is available to process the upgrade. Normally the facility 20 is positioned some distance remotely from the machine once the machine is with its operator, the facility 20 normally being sited at the place of manufacture of the machine. Details of the required 'upgrade' are then, together with the identification code, inputted to the processor 22 which can then provide either enabling code(s) for the "additional" function(s) which are then sent or inputted as previously described to the machine to be upgraded or can, by reference to its database obtain the set of functions for which the machine is already enabled, provide a full set of "new" enabling codes which will include those for the required additional function(s). In the former process, the enabling code for the additional function(s) received by or inputted to the machine are simply stored at an address in the memory 7 allocated to the codes for the particular function(s). In the latter case, the enabling code which existed in addresses in memory 7 prior to receipt of the new set of codes would be replaced, the new enabling code for a particular function not necessarily replicating the original code.

Although this description is of the apparatus and process as it is implemented for programming each machine with functions associated with the different types of detector means available within its construction in a way that will allow subsequent upgrading of the machines to be provided on a commercial basis, it is also intended to identify "functions" which identify with aspects which concern, for example, configurations of the machine operating modes, the transportable document details and characteristic information about the documents which can be process by the machine, for example, their pattern sets.

An additional, preferably random, number which can be obtained from the enabling code by the control system to enable the control system to extract information from the enabling code for validating with a stored function code.

The invention claimed is:

1. A document handling machine comprising a detector system for detecting one or more characteristic features of documents; and a control system for performing a number of functions related to information obtained from the detector system and/or the manner in which documents are handled, the control system including a memory that stores a set of codes, each code corresponding to a respective one of the functions, and being adapted to enable a function to be performed by an enabling code which corresponds in a valid manner with one of the stored function codes, wherein once the enabling code is supplied, the corresponding function is authorized for subsequent use, and all the functions are stored in the machine.

2. A machine according to claim 1, wherein the supplied enabling code is encrypted, the control system being adapted to validate a stored function code with the enabling code in either encrypted or decrypted form.

3. A machine according to claim 1, wherein the enabling code comprises a combination of a function code and a serial number unique to the machine, the machine further comprising a store for storing the serial number.

4. A machine according to claim 1, wherein the enabling code includes an additional, preferably random, number which can be obtained from the enabling code by the control system to enable the control system to extract information from the enabling code for validating with a stored function code.

5. A machine according to claim 1, wherein the enabling code includes a function code.

6. A machine according to claim 1, wherein the control system is adapted to set a flag if a supplied enabling code is found to correspond in a valid manner with a stored function code.

7. A machine according to claim 6, wherein the control system is adapted to check that a function has been validated before implementing that function for each document handled by the machine.

8. A machine according to claim 7, wherein the control system is adapted to check whether or not a flag has been set.

9. A machine according to claim 1, wherein at least one of said functions comprises the use of information from a designated detector of the detector system.

10. A machine according to claim 1, wherein at least one function corresponds to a mode of operation of the machine.

11. A machine according to claim 1, wherein the machine includes a document counter.

12. A machine according to claim 1, wherein the detector system and control system are adapted to handle bank notes.

13. A machine according to claim 1, wherein the control system is adapted to check that a function has been validated before implementing that function for each document handled by the machine.

14. A machine according to claim 1, wherein a selected set of codes is provided by a source to a user.

15. A machine according to claim 1, wherein additional functions are activated by acquiring new functional codes from a source.

16. A document handling machine comprising a detector system for detecting one or more characteristic features of documents; and a control system for performing a number of functions related to information obtained from the detector system and/or the manner in which documents are handled, the control system including a memory that stores a set of codes, each code corresponding to a respective one of the functions, and being adapted to enable a function to be performed by an enabling code which corresponds in a valid manner with one of the stored function codes, wherein once the enabling code is supplied, the corresponding function is authorized for subsequent use, and a selected set of codes is provided by a source to a user.

17. A document handling machine comprising a detector system for detecting one or more characteristic features of documents; and a control system for performing a number of functions related to information obtained from the detector system and/or the manner in which documents are handled, the control system including a memory that stores a set of codes, each code corresponding to a respective one of the functions, and being adapted to enable a function to be performed by an enabling code which corresponds in a valid manner with one of the stored function codes, wherein once the enabling code is supplied, the corresponding function is authorized for subsequent use, and additional functions are activated by acquiring new functional codes from a source.

* * * * *